US009311539B1

(12) United States Patent
Garrett

(10) Patent No.: US 9,311,539 B1
(45) Date of Patent: *Apr. 12, 2016

(54) AIRCRAFT CONTRAIL DETECTION

(71) Applicant: The Boeing Company, Chicago, IL (US)

(72) Inventor: Timothy Mark Garrett, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 594 days.

This patent is subject to a terminal disclaimer.

(21) Appl. No.: 13/790,569

(22) Filed: Mar. 8, 2013

Related U.S. Application Data

(63) Continuation-in-part of application No. 12/634,278, filed on Dec. 9, 2009, now Pat. No. 8,406,465.

(51) Int. Cl.
*G06K 9/00* (2006.01)
*B64D 33/04* (2006.01)

(52) U.S. Cl.
CPC .............. *G06K 9/0063* (2013.01); *B64D 33/04* (2013.01)

(58) Field of Classification Search
CPC ........ G06K 9/00; G06K 9/20; G06K 2209/27
See application file for complete search history.

(56) References Cited

U.S. PATENT DOCUMENTS

| 5,285,256 | A | 2/1994 | Nelson et al. | |
|---|---|---|---|---|
| 5,546,183 | A | 8/1996 | Fegley et al. | |
| 8,175,332 | B2 | 5/2012 | Harrington | |
| 8,402,736 | B2 * | 3/2013 | Noppel et al. | 60/39.5 |
| 2008/0262718 | A1 | 10/2008 | Farwell | |

OTHER PUBLICATIONS

Website reference entitled "F-35 Distributed Aperture System (EO DAS)," obtained at web address http://www.es.northropgrumman.com/solutions/f35targeting/ on Dec. 9, 2009; 2 pages.
Website reference entitled "Contrail Shadows," obtained at web address http://www.atoptics.co.uk/atoptics/contr2.htm on Dec. 9, 2009; 1 page.
Website reference entitled "Glory From the Air," obtained at web address http://www.atoptics.co.uk/droplets/glorair.htmon Dec. 9, 2009; 1 page.
Duda et al., "A Case Study of the Development of Contral Clusters over the Great Lakes," Journal of Atmospheric Sciences, vol. 61, Feb. 18, 2003 to Dec. 5, 2003, pp. 1132-1146.
U.S. Office Action dated Jun. 27, 2012 in U.S. Appl. No. 12/634,278.
U.S. Notice of Allowance dated Nov. 9, 2012 in U.S. Appl. No. 12/634,278.

* cited by examiner

*Primary Examiner* — Shefali Goradia
(74) *Attorney, Agent, or Firm* — Baldauff IP, LLC; Michael J. Baldauff, Jr.

(57) ABSTRACT

Concepts and technologies described herein provide for the detection of aircraft contrails through the identification of contrail shadows in real time imagery provided during a flight. According to one aspect of the disclosure provided herein, an antisolar point is located on a surface from the perspective of the aircraft in flight. Real time imagery encompassing the antisolar point is received and analyzed for a contrail indicator. When the contrail indicator is detected, it is determined that the aircraft is creating a contrail.

20 Claims, 10 Drawing Sheets

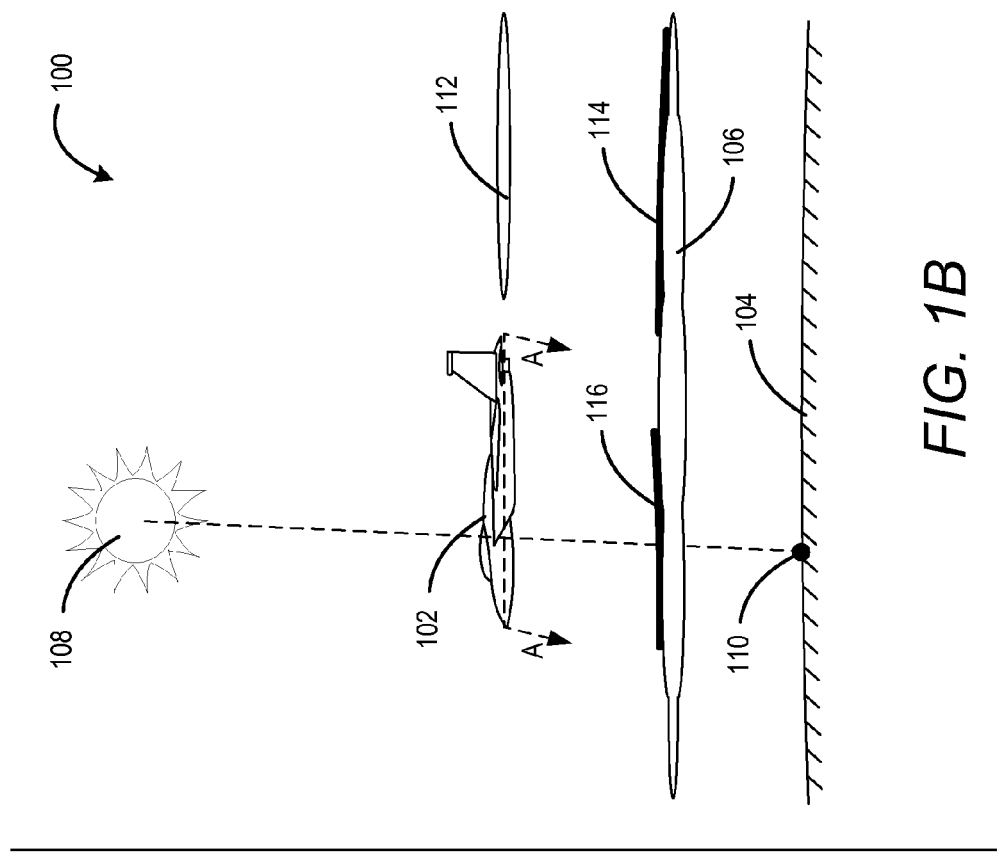
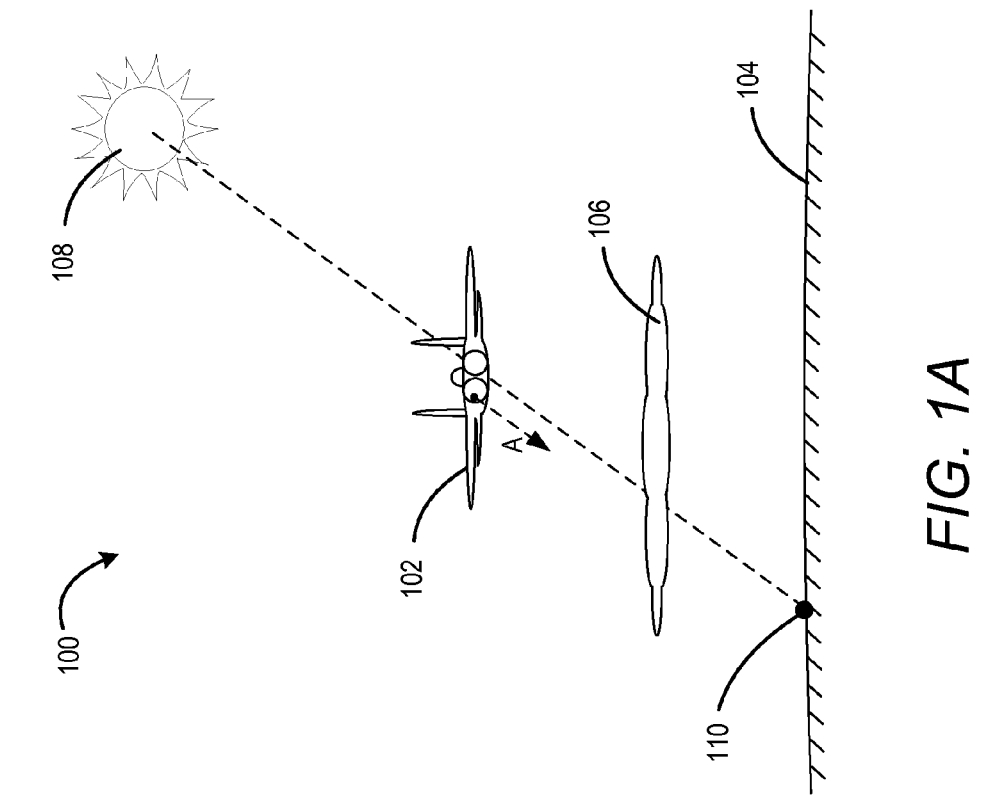

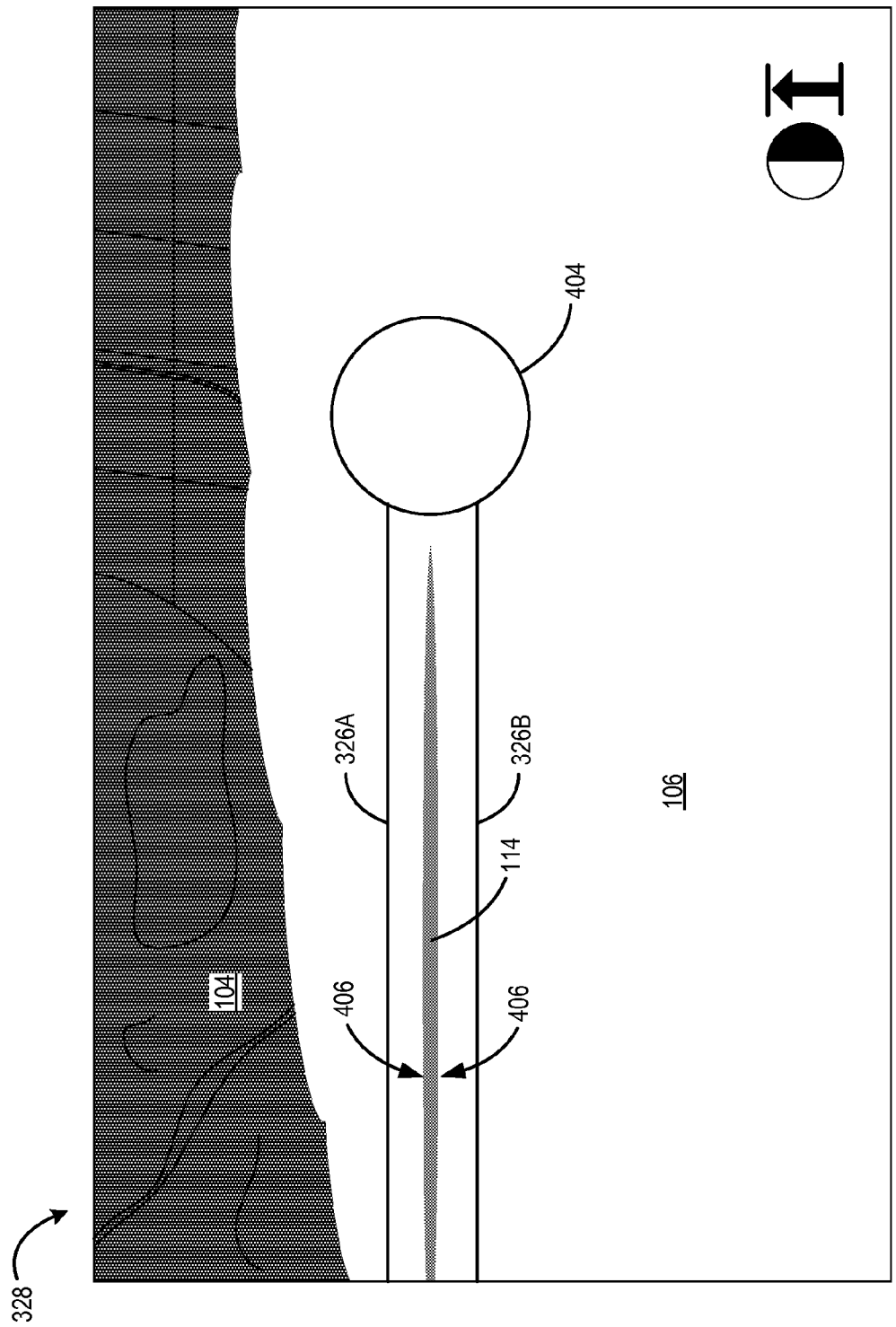

AIRCRAFT CONTRAIL DETECTION

CROSS-REFERENCE TO RELATED APPLICATIONS

This application is a continuation-in-part of U.S. patent application Ser. No. 12/634,278, now U.S. Pat. No. 8,406,465, filed on Dec. 9, 2009, entitled "AIRCRAFT CONTRAIL DETECTION," which is expressly incorporated by reference in its entirety.

FIELD OF THE DISCLOSURE

This disclosure relates generally to the detection of an aircraft condensation trail.

BACKGROUND

Condensation trails (contrails) are visible trails of water vapor that are created from aircraft engine exhaust. Contrails are often visible as white cloudy streaks across the sky, indicating a path recently traveled by an aircraft. The visibility of contrails, including the duration of time in which contrails remain visible before dissipating, is dependent upon various atmospheric conditions surrounding the aircraft, including among others, air temperature, barometric pressure, and humidity.

Because aircraft contrails form directly behind an aircraft and may be visible from anywhere from seconds to hours, contrails create a visual reference that points directly to the aircraft that creates them. Anyone that sees a contrail only has to follow the contrail to the end to see the aircraft that is the source of the contrail. For commercial and private aviation, this phenomenon is not a problem. However, for aircraft that are designed to avoid detection, a contrail can be a significant problem.

When a pilot of an aircraft determines that a contrail is being created, he or she can take any number of actions to prevent the formation of the contrail. Therefore, early detection of the contrail formation can be critically important to the pilot. Conventionally, contrail detection requires the use of one or more dedicated sensors, cameras, computers or other equipment mounted in the rear of an aircraft. Equipment positioned in the rear of an aircraft often result in the need for weight to be added to the front of the aircraft for stability purposes. While effective, a disadvantage to this dedicated equipment is the additional cost and weight associated with the equipment. Moreover, rearward facing cameras require windows in aircraft skin, which add to the cost and present additional issues.

It is with respect to these considerations and others that the disclosure made herein is presented.

SUMMARY

It should be appreciated that this Summary is provided to introduce a selection of concepts in a simplified form that are further described below in the Detailed Description. This Summary is not intended to be used to limit the scope of the claimed subject matter.

Methods, systems, and computer-readable storage media described herein provide for the detection of aircraft contrails through the identification of contrail shadows in real time imagery provided during a flight. According to various aspects of the disclosure provided herein, an antisolar point may be located from the perspective of an aircraft. Real time imagery of a surface below the aircraft that encompasses the antisolar point may be received and analyzed for an indicator of a contrail.

The features, functions, and advantages that have been discussed can be achieved independently in various embodiments of the present disclosure or may be combined in yet other embodiments, further details of which can be seen with reference to the following description and drawings.

BRIEF DESCRIPTION OF THE DRAWINGS

FIG. 1A is a rear view of an aircraft in flight, illustrating an antisolar point on a cloud deck and the earth below the aircraft according to various embodiments presented herein;

FIG. 1B is a side view of the aircraft in flight of FIG. 1A, showing a contrail and corresponding shadow of the contrail on the cloud deck below the aircraft according to various embodiments presented herein;

FIGS. 5A-5C are perspective views from the aircraft of FIGS. 1A and 1B showing the effects of increasing contrast within the real time imagery to aid in the search between upper and lower threshold boundary vectors for the contrail shadow according to various embodiments presented herein;

DETAILED DESCRIPTION

Figure 2:
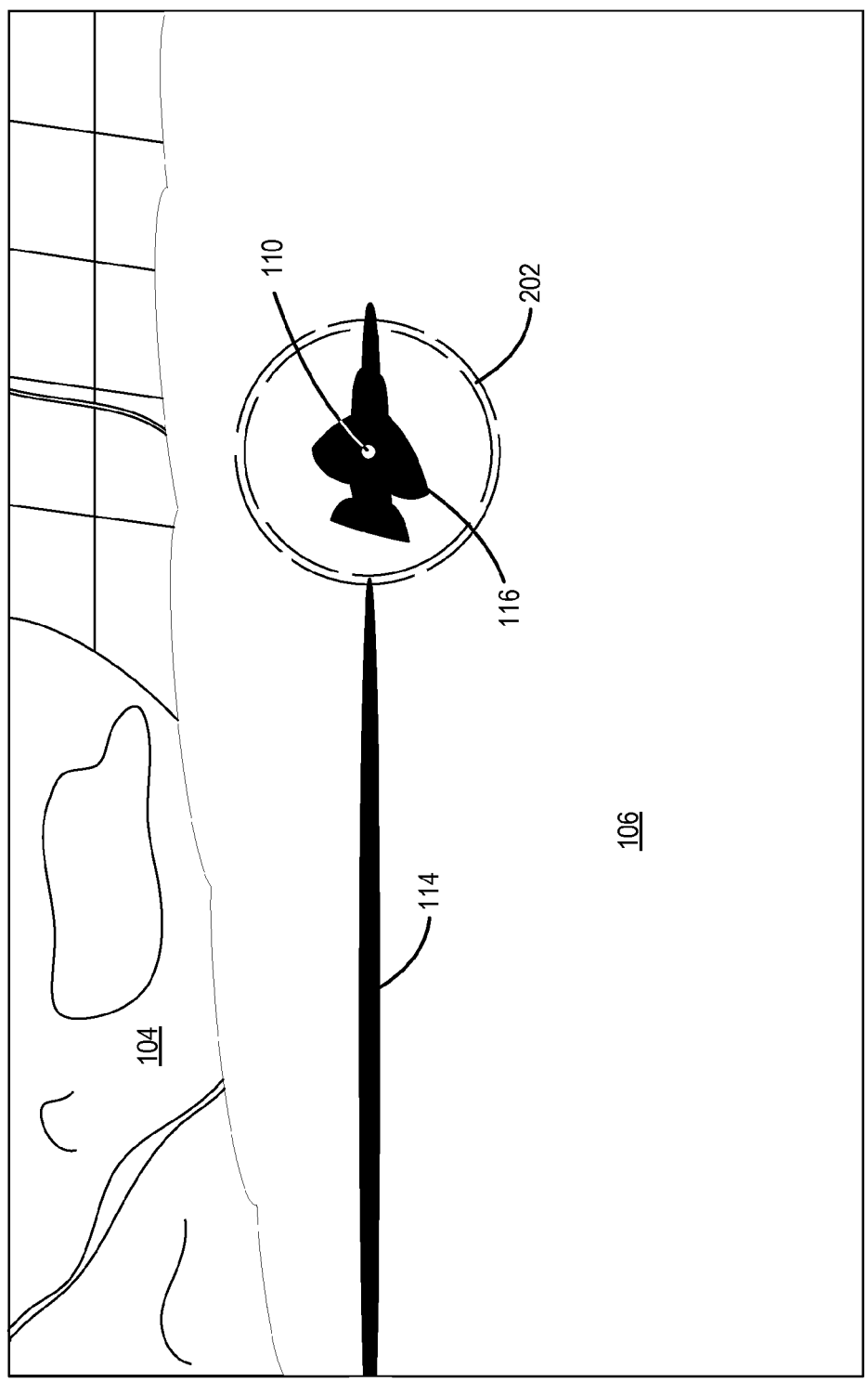
FIG. 2 is a perspective view from the aircraft of FIGS. 1A and 1B showing the contrail and aircraft shadows on the cloud deck according to various embodiments presented herein.

The following detailed description is directed to methods and systems for detecting aircraft contrails. Conventionally, contrail detection required dedicated equipment installed in the rear of the aircraft facing the contrail. However, utilizing dedicated equipment adds undesirable weight and cost to the aircraft.

Utilizing the concepts and technologies described herein, contrail detection can be accomplished using pre-existing cameras or other optical sensors, as well as pre-existing processing capabilities. Real time imagery is examined for shadows created by contrails. The determination of where to search within the imagery is made using various flight data input corresponding to the aircraft flight parameters and location, as well as the position of the sun or moon.

In the following detailed description, references are made to the accompanying drawings that form a part hereof, and which are shown by way of illustration, specific embodiments, or examples. Like numerals represent like elements through the several figures. Referring now to FIGS. 1A and 1B, an illustrative environment 100 in which various embodiments described herein are applicable will be described. This illustrative environment 100 includes an aircraft 102 flying over the earth 104 and a cloud deck 106. In this example, the illustrative environment 100 occurs during daylight hours, so the sun 108 is shining on the aircraft 102 with no additional clouds between the aircraft 102 and the sun 108. It should be understood that the concepts described herein are equally applicable to night environments in which the moon (not shown) casts light on the aircraft 102.

An antisolar point 110 is a point on the earth from the perspective of a viewer or camera that is directly opposite the sun. In other words, if a person were to draw a line or vector from the sun to the earth that intersects the person's head, the point on the earth at which the line falls is the antisolar point. From that person's perspective, the antisolar point would be the location of the shadow of his or her head on the ground or other opaque or semi-opaque object on which the shadow falls. FIG. 1A shows the antisolar point 110 at the location it falls on the earth 104. It should be noted that in this illustrative environment 100, the cloud deck 106 is positioned between the aircraft 102 and the antisolar point 110 on the surface of the earth 104. The broken line in this figure further illustrates the alignment of the aircraft 102, antisolar point 110, and sun 108.

As seen in FIG. 1B, the aircraft shadow 116 falls on the cloud deck 106 at a position that is aligned with the antisolar point 110. If the aircraft 102 is creating a contrail 112, then the contrail 112 will also create a shadow 114 on the cloud deck 106 or any other opaque or semi-opaque surface below the aircraft 102. This contrail shadow 114 will be directly behind the antisolar point 110 and aligned with the direction of flight of the aircraft 102. As will become clear from the disclosure below, by knowing the location of the antisolar point 110, and the direction of flight of the aircraft 102, then the location of any shadow being created by a contrail 112, if it exists, can be determined.

FIG. 2 shows a view from the aircraft 102 in the direction of lines A-A shown in FIGS. 1A and 1B. If a person were looking out of a window of the aircraft 102 in the direction of the antisolar point 110, or if a camera or other optical sensor were filming video or still imagery, FIG. 2 shows an illustrative example of what could be viewed from the perspective shown. In this example, the cloud deck 106 is seen with the earth 104 visible beyond and underneath the cloud deck 106. The aircraft shadow 116 is shown at a location on the cloud deck 106 that is aligned with the antisolar point 110, with the contrail shadow 114 trailing behind.

It should be understood that the aircraft shadow 116 and contrail shadow 114 are clearly illustrated in black in FIG. 2. However, in practice, depending on any number of factors, including but not limited to the time of day, height of the aircraft 102 above the cloud deck 106, any number and type of current atmospheric conditions, and clarity/definition of the contrail 112 being created, these shadows may not exist, may exist as clearly as shown, or in many situations, may exist but be substantially less defined and clear as those shown in FIG. 2. As will be illustrated below, the embodiments described below may be utilized to detect the contrail shadow 114 when it exists in any state of clarity.

FIG. 2 additionally shows a glory 202, or halo, surrounding the aircraft shadow 116 at the antisolar point 110. A glory is an atmospheric phenomenon that occurs in some circumstances when light is backscattered back toward the viewer, and the light source, by water particles in the air. This phenomenon occurs when the viewer is looking directly at the antisolar point so that the sun or other light source is directly behind the viewer. Glories, which are sometimes called halos, appear as rings of colored light, similar to rainbows. The glory 202 is shown here to illustrate that even when the aircraft shadow 116 is not easily seen, there could be a glory 202 that indicates the antisolar point 110 from which the contrail shadow 114 may extend. It should be appreciated that while the contrail detection system described below computes the antisolar point 110, it could optionally and additionally identify a glory 202, if one exists, using imaging filters and/or color recognition techniques, for aiding in the set up of a search area in which to look for the contrail shadow 114. However, it should also be appreciated that the embodiments described herein are not dependent on the existence of or identification of a glory 202.

Figure 3:
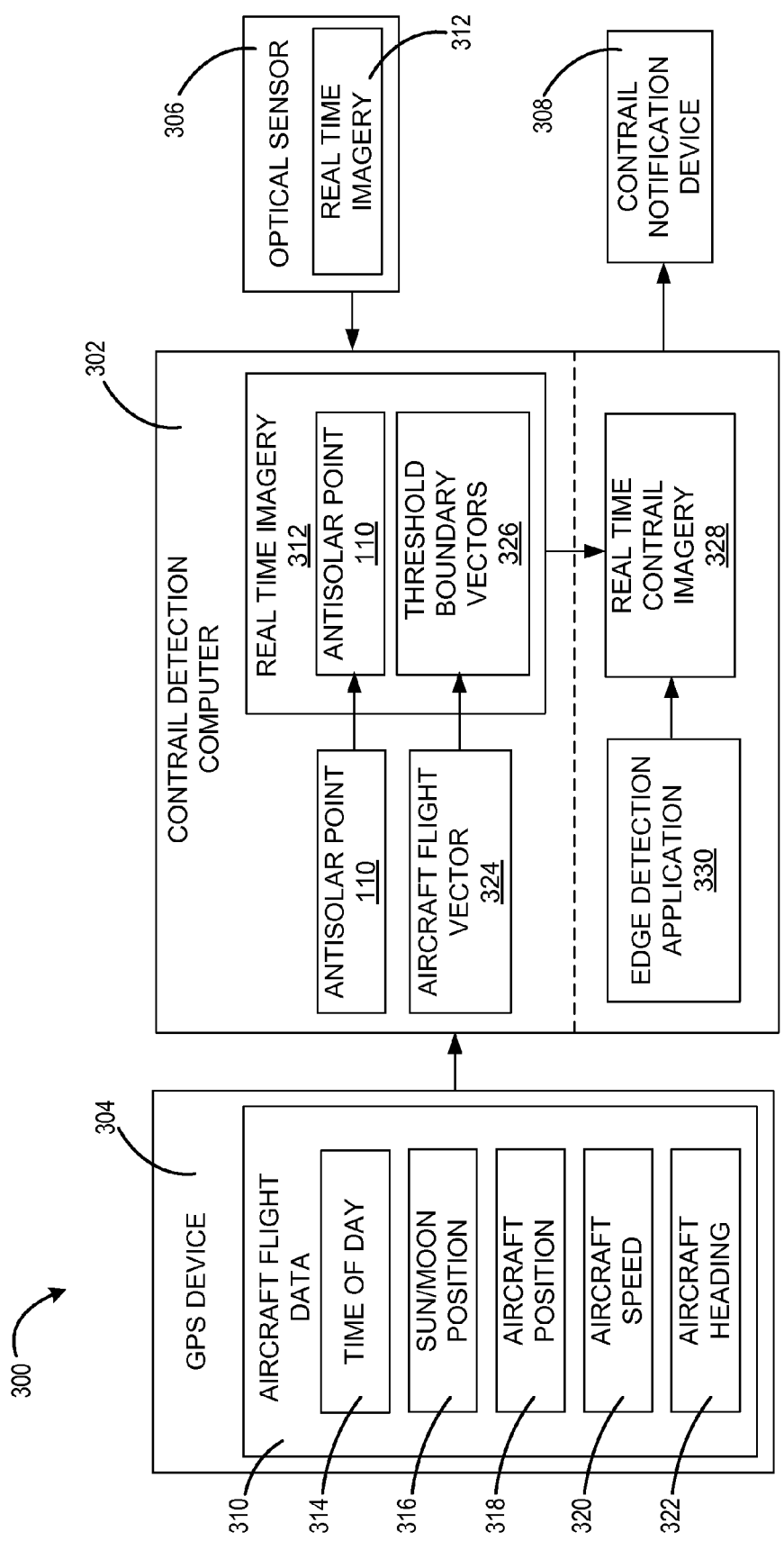
FIG. 3 is a block diagram illustrating a contrail detection system according to various embodiments presented herein.

Turning now to FIG. 3, a contrail detection system 300 will be described. An overview of the functionality of the contrail detection system 300 and associated components will be given with respect to FIG. 3, with greater detail provided while discussing the illustrative examples shown in FIGS. 4A-5C. According to various embodiments, the contrail detection system 300 includes a contrail detection computer 302, a global positioning system (GPS) device 304, one or more optical sensors 306, and a contrail notification device 308. It should be appreciated that one benefit of the disclosure provided herein over conventional contrail detection systems is that dedicated equipment is not required. Accordingly, while the contrail detection computer 302 could be a dedicated computer located anywhere in the aircraft 102, according to various embodiments, the contrail detection computer 302 may be part of any conventional flight computer, such as existing computers related to aircraft control systems, environmental systems, communications systems, weapon systems, radar systems, and/or navigational systems.

The contrail detection computer 302 receives and utilizes aircraft flight data 310 from the GPS device 304 and real time imagery 312 from the optical sensor 306 to determine whether a contrail shadow 114 exists, and if so, provides notification to the contrail notification device 308. It should be appreciated that the contrail notification device 308 may be any device that provides a visual, audible, or tactile notification to the pilot or a member of the flight crew that a contrail 112 exists. For example, the contrail notification device 308 may include a warning light or textual notification on a cockpit display, an audible tone delivered to a pilot's headset, a vibration input to an aircraft control stick, or any combination thereof.

The aircraft flight data 310 may include any type and quantity of data relating to the flight of the aircraft 102 and/or the environment, such as information related to positioning of the sun or other light source. The aircraft flight data 310 may be provided at least in part by a GPS device. According to various embodiments, the aircraft flight data 310 may include the time of day 314, the position 316 of the sun 108 or moon, the current position 318 of the aircraft 102, the current speed 320 of the aircraft 102 (groundspeed or otherwise), and the current heading 322 of the aircraft 102. The contrail detection computer 302 receives the aircraft flight data 310 from the GPS device 304 and utilizes the data to calculate the antisolar point 110 and an aircraft flight vector 324 corresponding to the speed and heading of the aircraft 102.

As discussed above, the antisolar point 110 may be determined according to the position of the sun 108 and of the aircraft 102. For example, typical GPS devices 304 are operative to provide a current time of day 314 and the position 316 of the sun 108, or data that may be used to calculate the position 316 of the sun 108. Knowing the exact date and time of day 314, the precise positioning of the sun 108 can be easily calculated using known techniques, or retrieved by the contrail detection computer 302 from celestial data stored in memory. With the position 316 of the sun known and the real time X/Y/Z coordinates of the aircraft position 318, the contrail detection computer 302 can determine the antisolar point 110 by extrapolating a line from the sun 108 to the aircraft 102 to intersect the earth at the antisolar point 110.

With the aircraft position 318, speed 320, and heading 322, the contrail detection computer 302 can create an aircraft flight vector 324 that may be associated with the antisolar point 110 to approximate where the contrail shadow 114 may be located with respect to the antisolar point 110. The contrail detection computer 302 receives real time imagery 312 from one or more optical sensors 306. The optical sensors 306 may include video and/or still image cameras mounted on or within the aircraft 102. These optical sensors 306 may be a part of an existing aircraft system. For example, a distributed aperture system (DAS) that includes a number of sensors for detecting and tracking missile launches and other aircraft, among other functionality, may be used to provide real time imagery 312 to the contrail detection computer 302. Similarly, the processing capabilities of existing DAS and other systems, as stated above, may be used to perform the operations described herein as being performed by the contrail detection computer 302.

The contrail detection computer 302 requests and receives the real time imagery 312 from the optical sensors 306 corresponding to the portion of the surrounding environment that encompasses the antisolar point 110. The aircraft flight vector 324 may be superimposed on the real time imagery such that it extends behind the antisolar point 110. From the aircraft flight vector 324, the contrail detection computer 302 may create and superimpose threshold boundary vectors 326 onto the real time imagery 312 to create real time contrail imagery 328 having a defined search area that will be analyzed for a contrail indicator representing a contrail shadow 114. Using image filtering and edge detection techniques, an edge detection application 330 looks for a substantially consistent contrast between the threshold boundary vectors 326 that would serve as a contrail indicator corresponding to the edge of a contrail shadow 114. If found, notification is provided to the contrail notification device 308 in a manner described above.

Figure 4A:
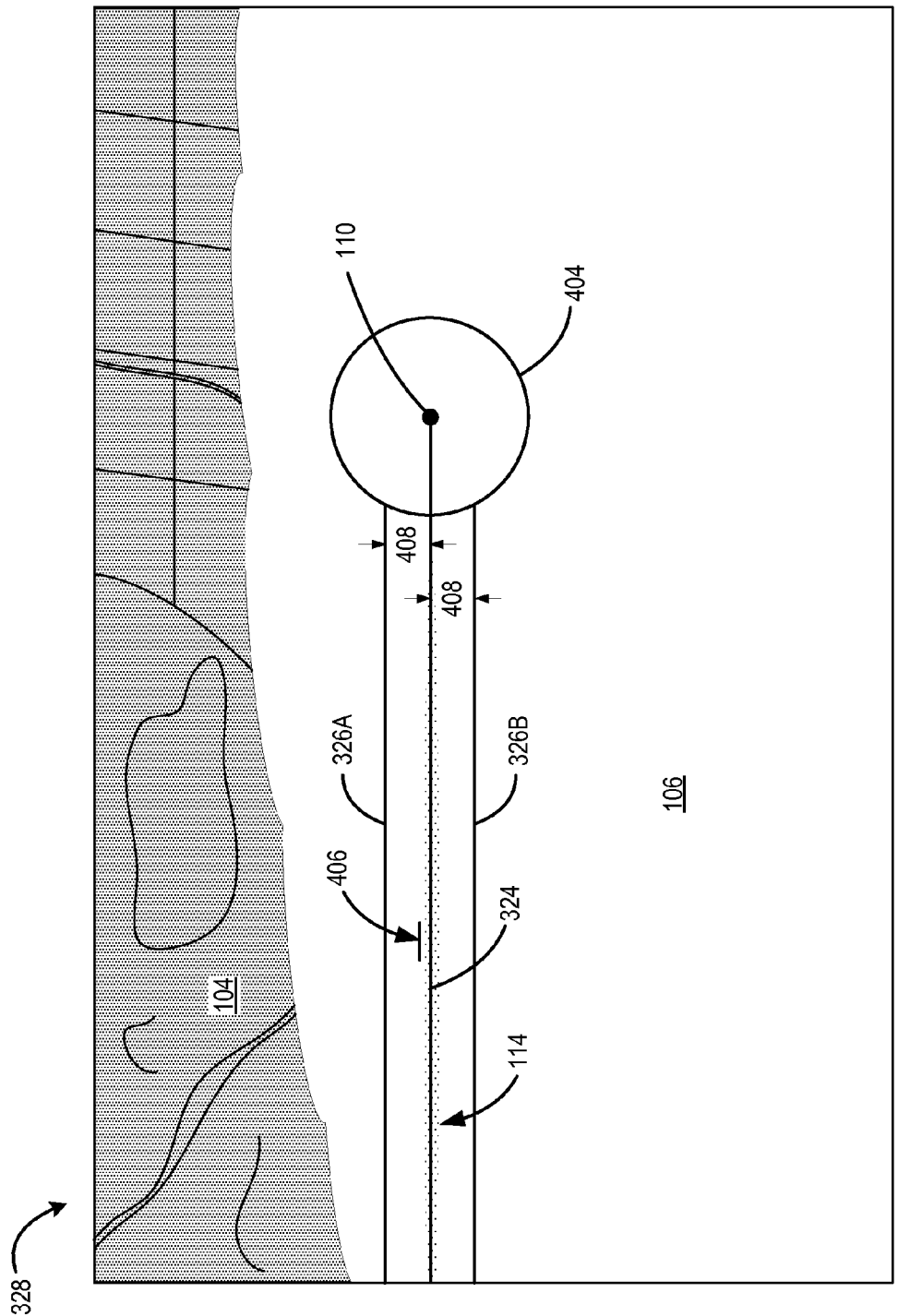
FIG. 4A is a perspective view from the aircraft of FIGS. 1A and 1B showing upper and lower threshold boundary vectors according to one embodiment presented herein.

Referring to FIG. 4A, the establishment of search parameters and the real time contrail imagery 328 will now be discussed. Once the contrail detection computer 302 has created the aircraft flight vector 324, it may be superimposed onto the real time imagery 312 starting at the antisolar point 110 and extending rearward in the direction of the determined flight path. When positioned on the real time imagery 312, the aircraft flight vector 324 approximates the positioning of the contrail shadow 114 since the contrail 112 is created in the path of the aircraft 102. Optionally, an antisolar point indictor 404 may be used to indicate the location of the antisolar point 110. The antisolar point indicator 404 may be sized to extend outward a desired distance surrounding the antisolar point 110 since the contrail 112 is formed a distance behind the aircraft 102 rather than immediately at the aircraft 102.

It should be understood that the term "superimposed" is not to be construed to be limited to creating a visual depiction of the aircraft flight vector 324 or any other component on the real time imagery so as to create real time contrail imagery 328 on a display for a pilot or other flight crew member that resembles the illustrative examples shown in FIGS. 4A-5C. While this visual depiction and display is contemplated, alternatively, the positioning of the antisolar point 110, aircraft flight vector 324, and/or the threshold boundary vectors 326 on the real time imagery 312 to create the search area of the real time contrail imagery 328, takes place virtually within the processor of the contrail detection computer 302, with any resulting contrail 112 detection being provided as a notification to the pilot via the contrail notification device 308.

Returning to FIG. 4A, in order to detect the contrail shadow 114, the disclosure provided herein utilizes edge detection technology, specifically the edge detection application 330, to detect the edge of the contrail shadow using the contrast between the darker shadow and the lighter opaque or semi-opaque backdrop, such as the cloud deck 106 or the surface of the earth 104. To detect this edge 406, the edge detection application 330 should search not only along the aircraft flight vector 324, but also around the aircraft flight vector. Due to variations in the size of any contrail 112, as well as inconsistencies of the location of the contrail shadow 114 and the aircraft flight vector 324 due to the potential for winds shifting the location of the contrail shadow 114, searching only along the superimposed aircraft flight vector 324 may not reveal a contrail indicator. For example, a particularly wide contrail 112 due to atmospheric conditions, distance between the contrail 112 and the contrail shadow 114, and/or dissipation of the contrail 112 may result in a wide shadow 114. A search for an edge 406 of the contrail shadow 114 along a narrow aircraft flight vector 324 may not produce any results. Consequently, aspects of this disclosure provide for a broader search area in which to search for the varying contrast that would indicate an edge 406 to a contrail shadow 114.

The search area may be defined by the antisolar point indicator 404, opposing threshold boundary vectors 326, and an edge of the real time contrail imagery 328 that opposes the direction of flight. According to the embodiment shown in FIG. 4A, the threshold boundary vectors 326 include an upper threshold boundary vector 326A and a lower threshold boundary vector 326B. Each threshold boundary vector 326 is positioned a distance 408 from the aircraft flight vector 324. The distance 408 may be fixed according to a desired threshold that balances a likelihood of success with the processing power and time required for larger search areas. Moreover, the distance 408 may be based on any number of flight parameters similar to those described above that affect the positioning of the contrail shadow 114, such as atmospheric conditions, distance between the contrail 112 and the contrail shadow 114, and/or dissipation of the contrail 112. The distance 408 may be fixed for all portions of the flight, or may dynamically change depending on changing atmospheric or flight conditions, mission requirements, and/or system resource allocation.

Figure 4B:
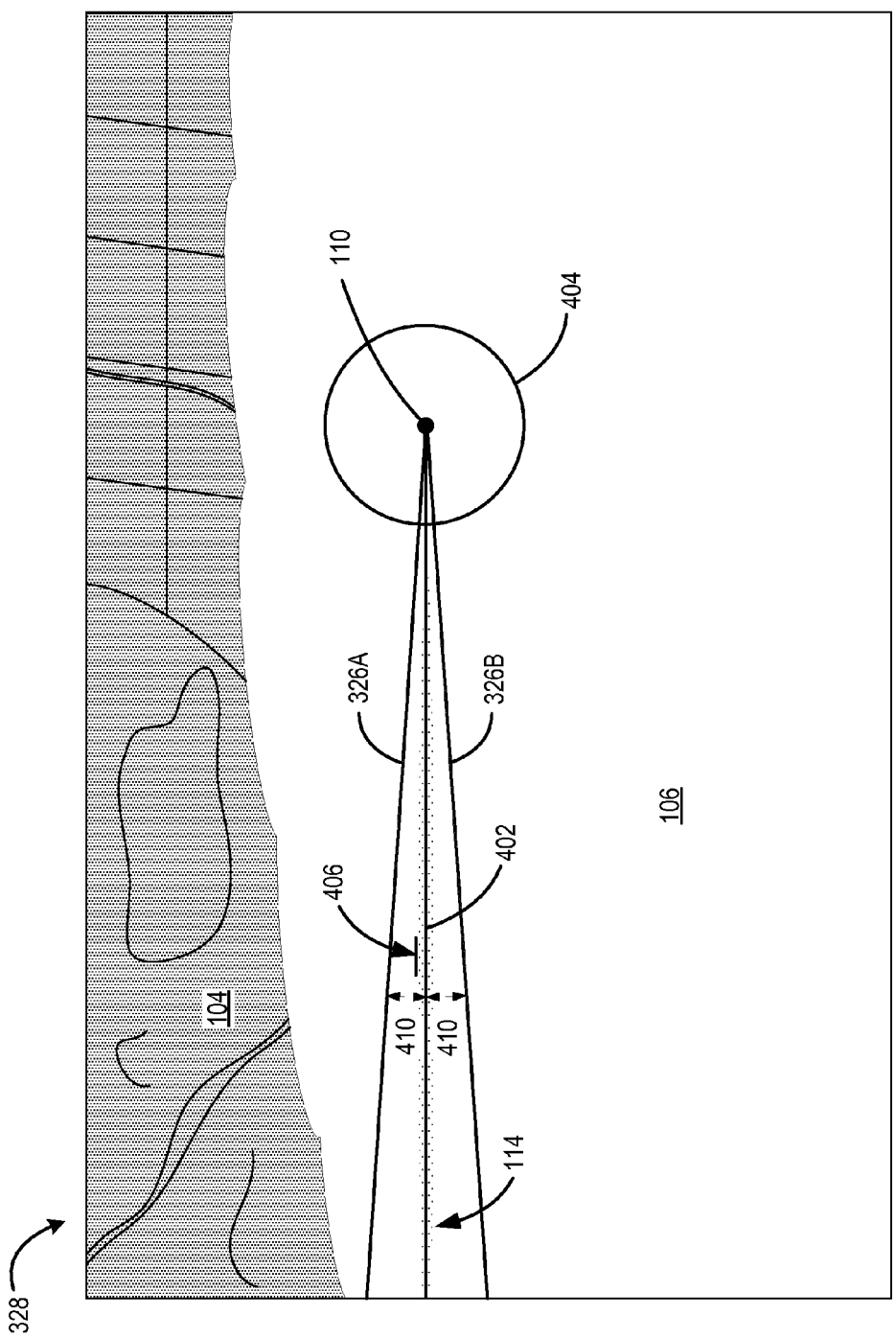
FIG. 4B is a perspective view from the aircraft of FIGS. 1A and 1B showing upper and lower threshold boundary vectors according to an alternative embodiment presented herein.

FIG. 4B illustrates an alternative embodiment of the real time contrail imagery 328 in which the threshold boundary vectors are not positioned a fixed distance 408 from the aircraft flight vector 324. Rather, the upper threshold boundary vector 326A is positioned an angular distance 410 from the aircraft flight vector 324 as rotated upward from the antisolar point 110 in a positive or clockwise direction. Similarly, the lower threshold boundary vector 326B is positioned a negative angular distance 410 from the aircraft flight vector 324 as rotated downward from the antisolar point 110 in a negative or counter-clockwise direction. In doing so, the search distance between the upper and lower threshold boundary vectors 326A and 326B increases as the distance from the antisolar point 110 increases. One reason for this is that the contrail shadow 114 is likely to be more clearly defined closer to the aircraft 102, which translates into a more clearly defined edge contrast at or near the aircraft flight vector 324 close to the antisolar point 110.

Figure 5A:
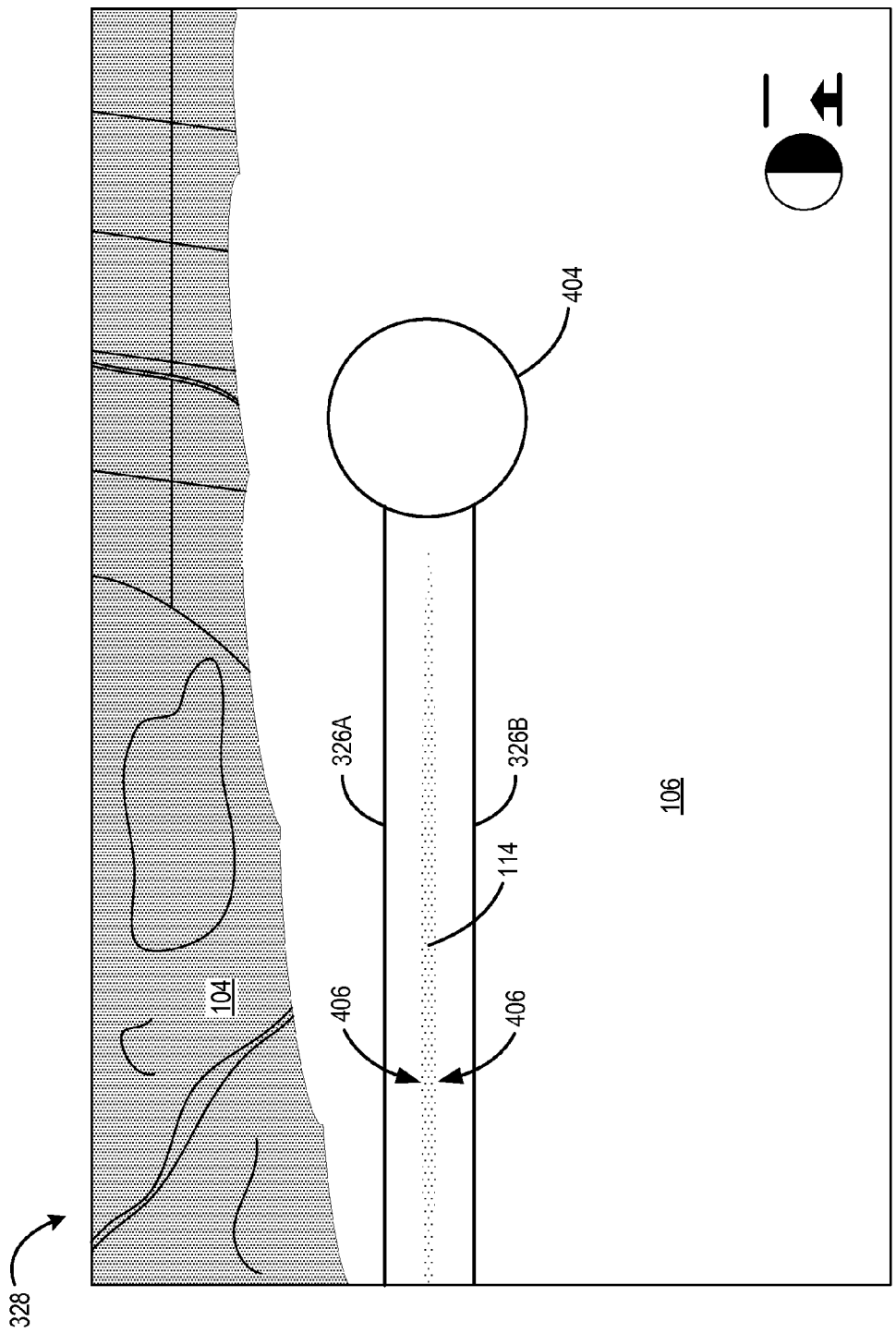
Figure 5B:
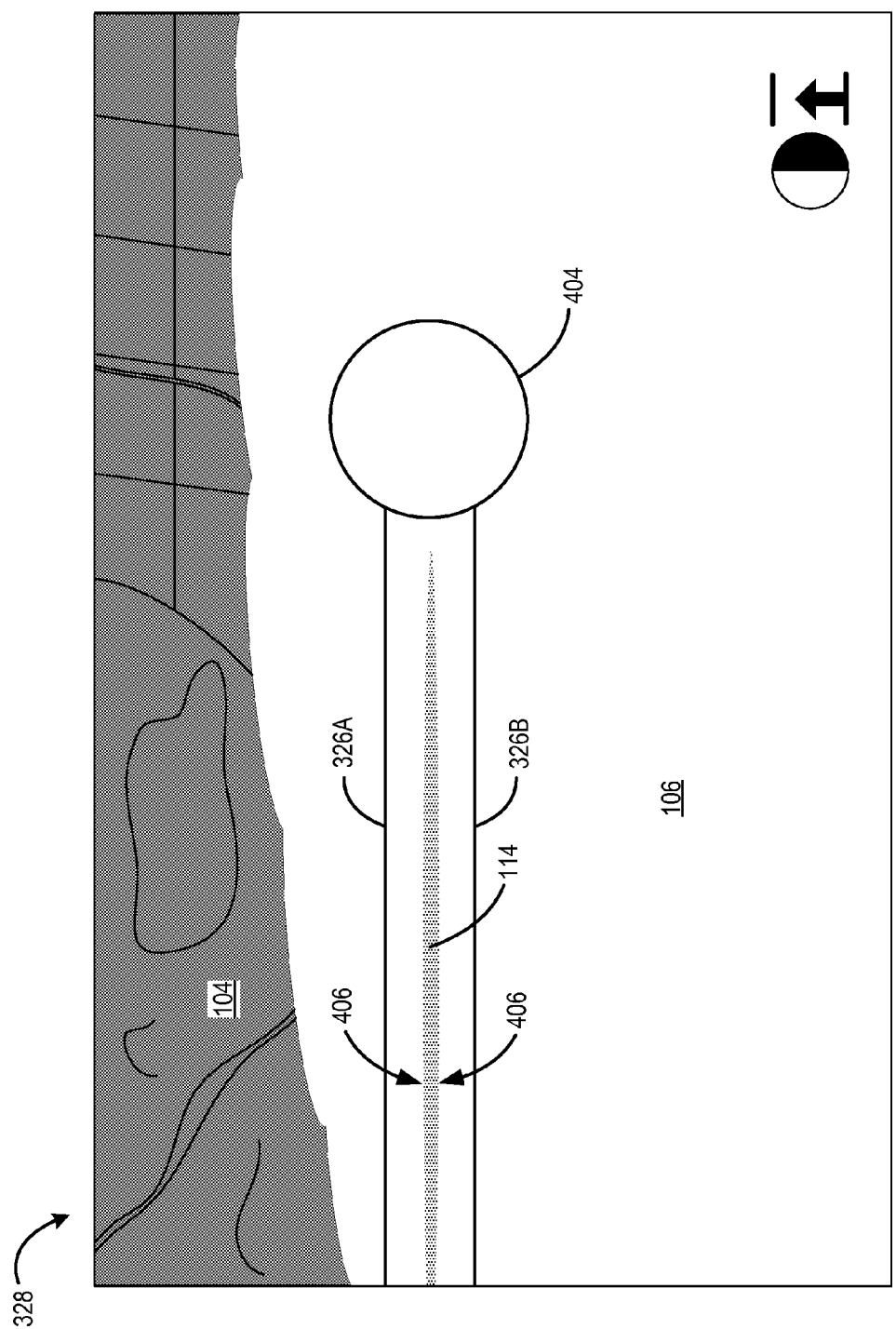

Looking now at FIGS. 5A-5C, an illustrative example of the manipulation of real time contrail imagery 328 to enhance the contrast between the contrail shadow 114 and the cloud deck 106 is shown. This image manipulation aids the edge detection application 330 in detecting the edge 406 of the shadow 114. From FIG. 5A to FIG. 5C, the contrast is increased to darken the features of the contrail shadow 114 in comparison to the surrounding surface of the cloud deck 106. While the environmental features and details within the real time contrail imagery 328 have been simplified for clarity, it can be seen from the progression of contrast modification from FIG. 5A to FIG. 5C that real time images can be manipulated using known techniques to reduce unwanted noise or clutter, and/or to heighten features to be detected by edge detection software such as the edge detection application 330. It should be appreciated that any number of filtering techniques may be applied to the real time contrail imagery 328 in order to enhance the image in any desired manner.

Figure 6:
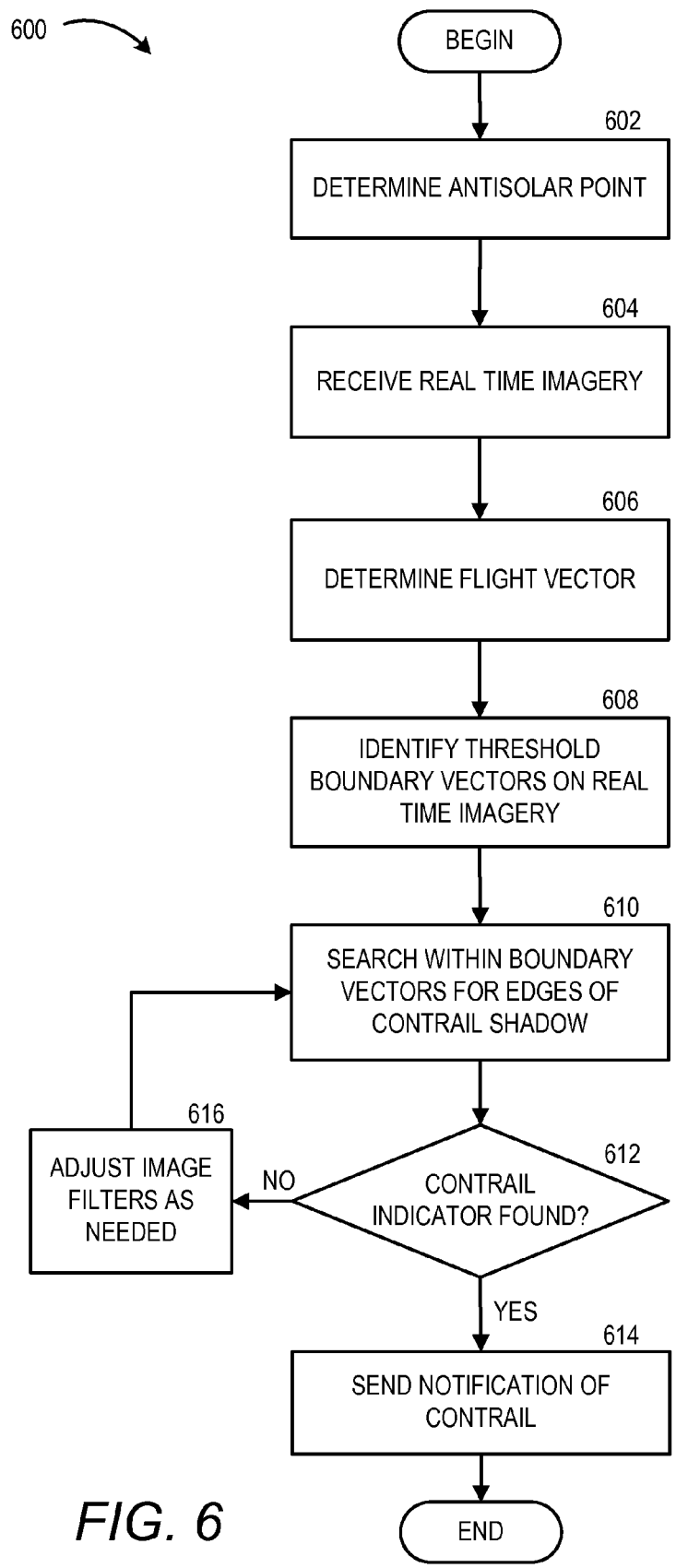
FIG. 6 is a flow diagram showing a method for detecting an aircraft contrail according to various embodiments presented herein.

Turning now to FIG. 6, an illustrative routine 600 for detecting aircraft contrails will now be described in detail. It should be appreciated that the logical operations described herein with respect to FIG. 6 and the other figures are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The routine 600 begins at operation 602, where the contrail detection computer 302 determines the antisolar point 110 utilizing the aircraft flight data 310 received from the GPS device 304. The contrail detection computer 302 receives real time imagery 312 that encompasses the antisolar point 110 at operation 604. From operation 604, the routine 600 continues to operation 606, where the contrail detection computer 302 creates the aircraft flight vector 324. The vector may be created using the current aircraft position 318, speed 320, and heading 322, and positioned on the real time imagery 312 such that the vector ends at the antisolar point 110.

The routine 600 continues from operation 606 to operation 608, where the upper and lower threshold boundary vectors 326A and 326B are created and positioned on the real time imagery 312. As discussed above, the threshold boundary vectors 326 may be placed a fixed distance 408 from either side of the aircraft flight vector 324, or may be rotated an angular distance 410 from the antisolar point 110 away from the aircraft flight vector 324. From operation 610, the routine 600 continues to operation 612, where a search is conducted within the defined search area for a contrail indicator such as a consistent contrast difference along the direction of the aircraft flight vector 324. Such a difference in contrast could indicate an edge of a contrail shadow 114. A determination is made as to whether a contrail indicator was found, and if so, then at operation 614, notification is made via a contrail notification device 308 that a contrail 112 exists, and the routine ends.

However, if at operation 612, a contrail indicator is not identified, then the routine 600 proceeds to operation 616 and any number of imaging filters are adjusted to enhance the real time contrail imagery 328. Following the example discussed above, the contrast of the image may be increased to darken the areas that potentially represent a contrail shadow 114. After adjustment has been made to the real time contrail imagery 328, the routine 600 returns to operation 610 and continues as described above until a contrail 112 is detected.

Figure 7:
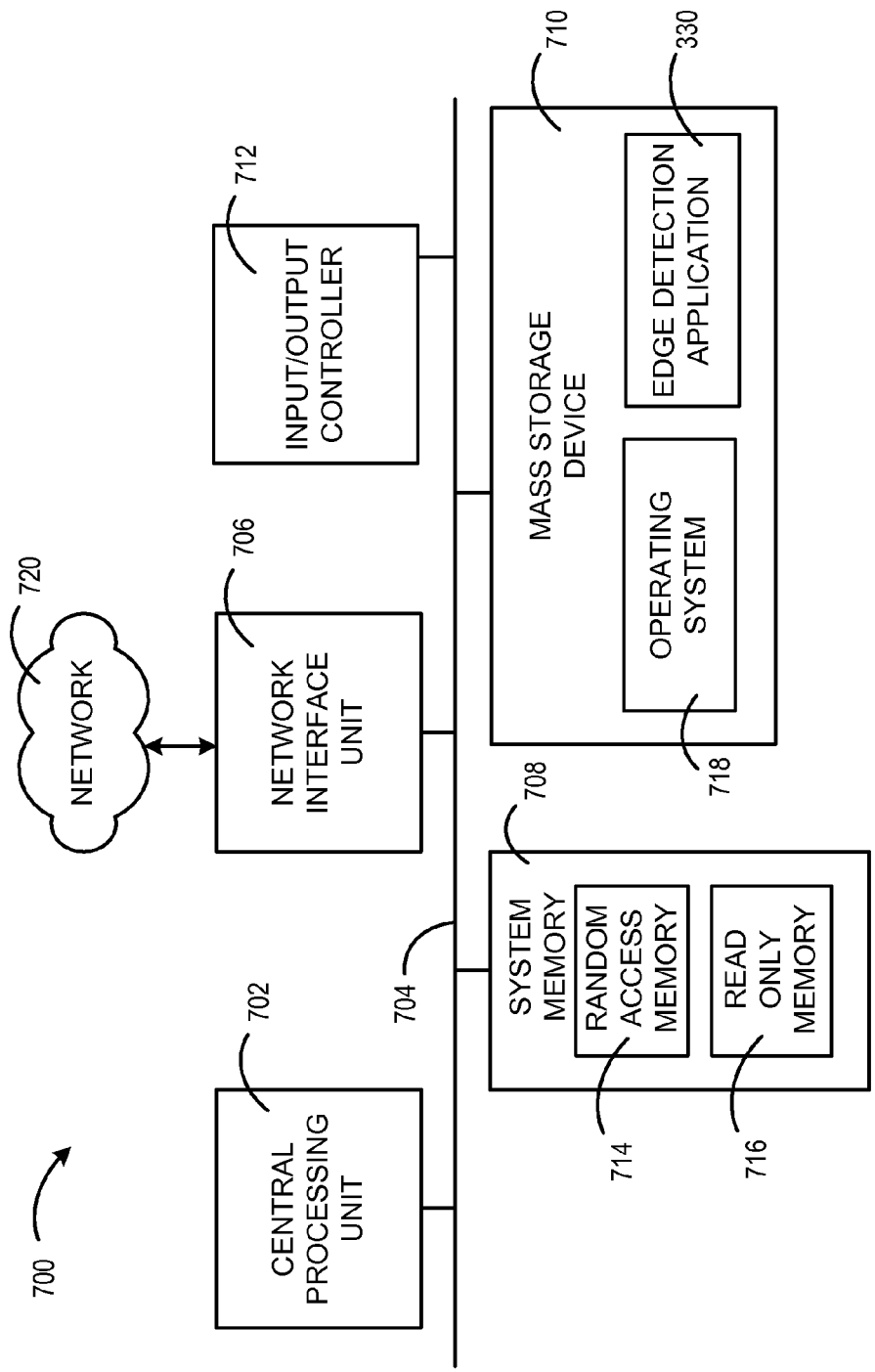
FIG. 7 is a block diagram showing an illustrative computer hardware and software architecture for a computing system capable of implementing aspects of the embodiments presented herein.

FIG. 7 shows an illustrative computer architecture for a contrail detection computer 302 capable of executing the software components described herein. The computer architecture shown in FIG. 7 may be utilized to execute any aspects of the software components presented herein. It is contemplated that the contrail detection computer 302 may not include all of the components shown in FIG. 7, may include other components that are not explicitly shown in FIG. 7, or may utilize an architecture completely different than that shown in FIG. 7. For example, as discussed above, the contrail detection computer 302 may additionally provide the functionality of any conventional flight computer, such as related to aircraft control systems, environmental systems, communications systems, weapon systems, radar systems, and/or navigational systems.

The computer architecture shown in FIG. 7 includes a central processing unit 702 (CPU), a system memory 708, including a random access memory 714 (RAM) and a read-only memory (ROM) 716, and a system bus 704 that couples the memory to the CPU 702. A basic input/output system containing the basic routines that help to transfer information between elements within the contrail detection computer 302, such as during startup, is stored in the ROM 716. The contrail detection computer 302 further includes a mass storage device 710 for storing an operating system 718, application programs, and other program modules, which are described in greater detail herein.

The mass storage device 710 is connected to the CPU 702 through a mass storage controller (not shown) connected to the bus 704. The mass storage device 710 and its associated computer readable storage media provide non-volatile storage for the contrail detection computer 302. Although the description of computer readable storage media contained herein refers to a mass storage device, such as a hard disk or CD-ROM drive, it should be appreciated by those skilled in the art that computer storage media can be any available computer storage media that can be accessed by the contrail detection computer 302.

By way of example, and not limitation, computer readable storage media may include volatile and non-volatile, removable and non-removable media implemented in any method or technology for storage of information such as computer readable and executable instructions, data structures, program modules or other data. For example, computer storage media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium which can be used to store the desired information and which can be accessed by the contrail detection computer 302.

According to various embodiments, the contrail detection computer 302 may operate in a networked environment using logical connections to remote computers through a network such as the network 720. The contrail detection computer 302 may connect to the network 720 through a network interface unit 706 connected to the bus 704. It should be appreciated that the network interface unit 706 may also be utilized to connect to other types of networks and remote computer systems. The contrail detection computer 302 may also include an input/output controller 712 for receiving and processing input from a number of other devices, including a keyboard, mouse, or electronic stylus (not shown in FIG. 7).

Similarly, an input/output controller may provide output to a display, a printer, or other type of output device.

As mentioned briefly above, a number of program modules and data files may be stored in the mass storage device 710 and RAM 714 of the contrail detection computer 302, including an operating system 718 suitable for controlling the operation of a networked desktop, laptop, or server computer. The mass storage device 710 and RAM 714 may also store one or more program modules. In particular, the mass storage device 710 and the RAM 714 may store the edge detection application 330, which was described in detail above with respect to FIGS. 3-6. The mass storage device 710 and the RAM 714 may also store other types of program modules and data.

It should be appreciated that the software components described herein may, when loaded into the CPU 702 and executed, transform the CPU 702 and the overall contrail detection computer 302 from a general-purpose computing system into a special-purpose computing system customized to facilitate the functionality presented herein. The CPU 702 may be constructed from any number of transistors or other discrete circuit elements, which may individually or collectively assume any number of states. More specifically, the CPU 702 may operate as a finite-state machine in response to executable instructions contained within the software modules disclosed herein. These computer-executable instructions may transform the CPU 702 by specifying how the CPU 702 transitions between states, thereby transforming the transistors or other discrete hardware elements constituting the CPU 702.

Based on the foregoing, it should be appreciated that technologies for providing for contrail detection have been disclosed herein. Although the subject matter presented herein has been described in language specific to computer structural features, methodological and transformative acts, specific computing machinery, and computer readable media, it is to be understood that the disclosure defined in the appended claims is not necessarily limited to the specific features, acts, or media described herein. Rather, the specific features, acts and mediums are disclosed as example forms of implementing the claims The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

What is claimed is:

1. A computer-implemented method for detecting a contrail of an aircraft with a contrail detection computer, comprising:
    locating with the contrail detection computer an antisolar point from a perspective of the aircraft;
    receiving real time imagery encompassing the antisolar point at the contrail detection computer;
    analyzing the real time imagery for detection of a contrail indicator; and
    in response to detecting the contrail indicator, determining that the contrail is being created by the aircraft.

2. The computer-implemented method of claim 1, further comprising:
    receiving aircraft flight data at the contrail detection computer, wherein the aircraft flight data comprises time of day data, sun or moon position data, and aircraft position data, and wherein locating the antisolar point from the perspective of the aircraft comprises utilizing the aircraft flight data to locate the antisolar point from the perspective of the aircraft.

3. The computer-implemented method of claim 2, wherein utilizing the aircraft flight data to locate the antisolar point from a perspective of the aircraft comprises determining a location on a surface of the earth that is aligned with the aircraft and the sun or moon.

4. The computer-implemented method of claim 2, further comprising:
    utilizing the aircraft flight data to create a flight vector extending from the antisolar point; and
    associating the antisolar point and the flight vector with corresponding locations on the real time imagery,
    wherein analyzing the real time imagery for detection of the contrail indicator comprises searching the real time imagery for the contrail indicator substantially along the flight vector.

5. The computer-implemented method of claim 4, wherein searching the real time imagery for the contrail indicator along the flight vector comprises:
    creating an upper threshold boundary vector extending from the antisolar point a threshold distance above the flight vector or a threshold positive angle from the antisolar point;
    creating a lower threshold boundary vector extending from the antisolar point a threshold distance below the flight vector or a threshold negative angle from the antisolar point; and
    searching for the contrail indicator between the upper threshold boundary vector and the lower threshold boundary vector.

6. The computer-implemented method of claim 5, wherein the contrail indicator comprises an edge of a shadow corresponding to the contrail.

7. The computer-implemented method of claim 6, wherein the edge of the shadow is defined by a substantially consistent difference in contrast aligned substantially parallel to the flight vector.

8. The computer-implemented method of claim 7, further comprising manipulating the contrast of the real time imagery to enhance a difference in contrast between the edge of the shadow and the opaque or semi-opaque surface below the aircraft.

9. The computer-implemented method of claim 1, wherein receiving real time imagery at the contrail detection computer encompassing the antisolar point comprises receiving real time imagery of an opaque or semi-opaque surface below the aircraft.

10. The computer-implemented method of claim 9, wherein the opaque or semi-opaque surface below the aircraft comprises a cloud deck or a surface of the earth.

11. The computer-implemented method of claim 1, wherein receiving real time imagery at the contrail detection computer encompassing the antisolar point comprises receiving real time imagery from one or more optical sensors mounted on or within the aircraft and directed in a direction of the antisolar point.

12. The computer-implemented method of claim 1, further comprising providing a notification to a pilot that the contrail is being created.

13. A system for detecting a contrail of an aircraft, the system comprising:
    a processor;
    a memory coupled to the processor; and a program module (i) which executes in the processor from the memory and (ii) which, when executed by the processor, causes the system to detect the contrail of the aircraft by locating an antisolar point from a perspective of the aircraft, receiving real time imagery encompassing the antisolar point, and analyzing the real time imagery for detection of a contrail indicator.

14. The system of claim 13, further comprising:

receiving aircraft flight data corresponding to a position of the aircraft and to a position of the sun or moon; and determining the antisolar point according to the aircraft flight data.

15. The system of claim 14, further comprising:

a global positioning system device configured to provide the aircraft flight data to the program module; and one or more optical sensors mounted on or within the aircraft, the one or more optical sensors configured to provide the real time imagery to the program module.

16. The system of claim 13, wherein analyzing the real time imagery for detection of a contrail indicator, and in response to detecting the contrail indicator, determining that the contrail is being created by the aircraft comprises:

superimposing an aircraft flight vector on the real time imagery at the antisolar point;

determining whether a shadow exists in the real time imagery substantially along the aircraft flight vector; and responsive to determining that the shadow exists substantially along the aircraft flight vector, determining that the aircraft is creating a contrail.

17. The system of claim 16, wherein the program module, when executed by the processor, further causes the system to detect the contrail of the aircraft by creating an upper threshold boundary vector extending from the antisolar point a threshold distance above the flight vector or a threshold positive angle from the antisolar point, creating a lower threshold boundary vector extending from the antisolar point a threshold distance below the flight vector or a threshold negative angle from the antisolar point, and searching for the contrail indicator between the upper threshold boundary vector and the lower threshold boundary vector.

18. The system of claim 16, wherein the program module, when executed by the processor, further causes the system to detect the contrail of the aircraft by enhancing a contrast between the shadow of the contrail and an opaque or semi-opaque surface beneath the aircraft, and determining whether a shadow exists in the real time imagery substantially along the aircraft flight vector by detecting an edge of the shadow according to a difference in contrast between the edge of the shadow and the opaque or semi-opaque surface.

19. A non-transitory computer-readable storage medium having computer-executable instructions stored thereon which, when executed by a computer, cause the computer to:

determine an antisolar point from a perspective of an aircraft;

receiving real time imagery encompassing the antisolar point; and analyze the real time imagery for detection of a contrail indicator.

20. The non-transitory computer-readable storage medium of claim 19, further comprising computer-executable instructions stored thereon which, when executed by the computer, further cause the computer to:

receive aircraft flight data corresponding to one or more aircraft flight parameters and to a position of the sun or moon;

determine the antisolar point according to the aircraft flight data; and determine an aircraft flight vector according to the one of more aircraft flight parameters, wherein causing the computer to analyze the real time imagery for detection of a contrail indicator, and in response to detecting the contrail indicator, determine that the contrail is being created by the aircraft comprises causing the computer to:

superimpose the aircraft flight vector on the real time imagery, determine whether a shadow exists in the real time imagery substantially along the aircraft flight vector, manipulate one or more characteristics of the real time imagery to enhance a visible distinction between the shadow of the contrail and an opaque or semi-opaque surface below the aircraft on which the shadow is visible, detect the visible distinction along the aircraft flight vector to determine that the shadow exists, and responsive to determining that the shadow exists substantially along the aircraft flight vector, determine that the aircraft is creating a contrail.

* * * * *